US 9,335,433 B2

(12) United States Patent
Li et al.

(10) Patent No.: US 9,335,433 B2
(45) Date of Patent: *May 10, 2016

(54) DIELECTRIC TOOL-BASED FORMATION POROSITY LOGGING SYSTEM AND METHODS

(75) Inventors: Jing Li, Pearland, TX (US); Gary Kainer, Tomball, TX (US); Marvin Rourke, Banstead (GB); Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/110,803

(22) PCT Filed: Sep. 26, 2011

(86) PCT No.: PCT/US2011/053215
§ 371 (c)(1),
(2), (4) Date: Oct. 9, 2013

(87) PCT Pub. No.: WO2012/145021
PCT Pub. Date: Oct. 26, 2012

(65) Prior Publication Data
US 2014/0035590 A1  Feb. 6, 2014

Related U.S. Application Data

(63) Continuation-in-part of application No. PCT/US2011/032877, filed on Apr. 18, 2011.

(51) Int. Cl.
*G01V 3/30*  (2006.01)

(52) U.S. Cl.
CPC ..................... *G01V 3/30* (2013.01)

(58) Field of Classification Search
CPC ....................................................... G01V 3/30
USPC .............. 324/323–375; 702/1–18; 175/42–50
See application file for complete search history.

(56) References Cited

U.S. PATENT DOCUMENTS 4,151,457 A * 4/1979 Rau ................................ 324/324
4,774,471 A  9/1988 Sims et al.
(Continued)

FOREIGN PATENT DOCUMENTS

GB  1088824 A  10/1967
WO  95/24663 A1  9/1995

OTHER PUBLICATIONS

International Search Report and Written Opinion, International Application No. PCT/US2011/053215, 13 pgs., Jan. 27, 2012.
(Continued)

*Primary Examiner* — Tung X Nguyen
*Assistant Examiner* — Zannatul Ferdous
(74) *Attorney, Agent, or Firm* — Benjamin Fite; Baker Botts L.L.P.

(57) ABSTRACT

A method and system for calculating formation porosity is presented. The method includes calculating formation porosity of a borehole by obtaining complex dielectric constant measurements with a high frequency dielectric tool. Next, a dielectric constant of formation water is derived from the complex dielectric constant measurements. Finally, a formation porosity is determined based at least in part on the measured complex dielectric constant and the derived dielectric constant formation water.

18 Claims, 4 Drawing Sheets

(56) References Cited

U.S. PATENT DOCUMENTS

| | | | |
|---|---|---|---|
| 4,780,679 A * | 10/1988 | Kenyon et al. | 324/338 |
| 5,811,973 A * | 9/1998 | Meyer, Jr. | 324/338 |
| 8,947,092 B2 * | 2/2015 | Li et al. | 324/333 |
| 2007/0061083 A1 * | 3/2007 | Habashy et al. | 702/11 |
| 2010/0283486 A1 * | 11/2010 | Comparon et al. | 324/686 |

OTHER PUBLICATIONS

Sherman, Michael M., "The Calculation of Porosity From Dielectric Constant Measurements: A Study Using Laboratory Data", The Log Analyst, Jan. 1, 1986, pp. 15-24.

* cited by examiner

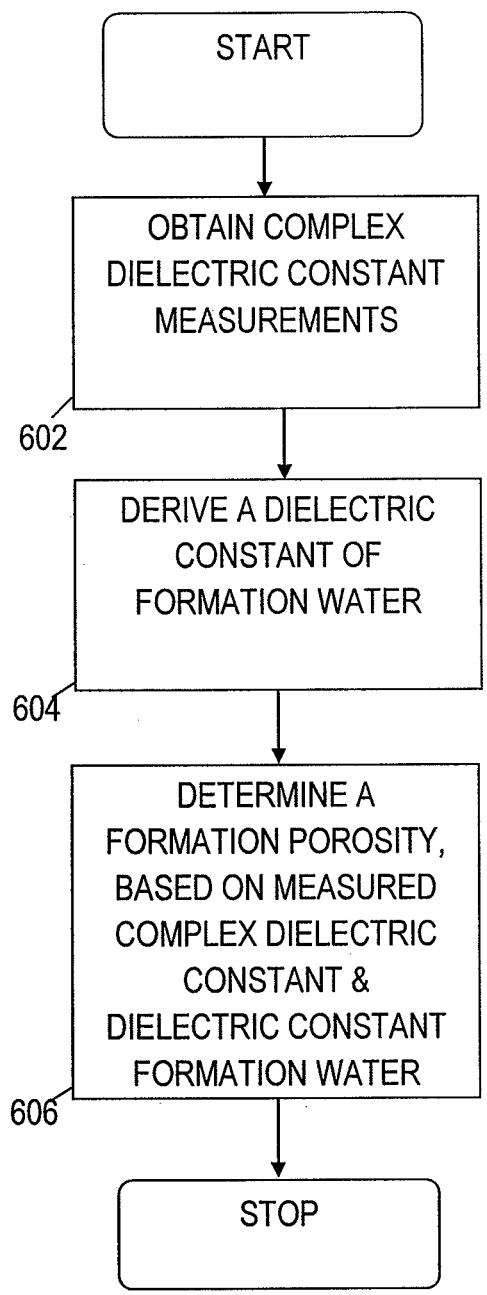

DIELECTRIC TOOL-BASED FORMATION POROSITY LOGGING SYSTEM AND METHODS

CROSS-REFERENCE TO RELATED APPLICATIONS

This application is a U.S. National Stage Application of International Application No. PCT/US2011/053215 filed Sep. 26, 2011, which claims priority to PCT Application Serial No. PCT/US2011/32877 titled "Methods and Systems for Estimating Formation Resistivity and Porosity" and filed Apr. 18, 2011 by inventors J. Li, M. Bittar, G. Kainer, and M. Rourke and is continuation-in part thereof, and which are hereby incorporated by reference in their entirety.

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, "logging while drilling" (LWD), drillpipe conveyed logging, and coil tubing conveyed logging. A variety of logging tools are available for use with each of these methods.

One example of an available wireline logging and LWD tool is a high frequency dielectric tool (HFDT). Such tools determine the dielectric constant and conductivity of downhole formations from the real and imaginary parts of the complex propagation constant of electromagnetic waves traveling through the formations. (See, e.g., T. J. Calvert, R. N. Rau and L. E. Wells, "Electromagnetic propagation . . . A new dimension in logging," presented at the Annual Meeting SPE, Bakersfield, Calif., April 1977, Paper 6542; D. S. Daev, Vysokochastonye Electromagnitnye Melody Issledevity. Skhvazhin:publ.House "Nedra," Moscow, 1970; and R. A. Meador and P. T. Cox, "Dielectric constant logging, a salinity independent estimation of formation water volume," presented at the Annual Meeting SPE, Dallas, Tex., Oct. 1, 1975, Paper 5504). The HFDT measurements may be used in accordance with the Complex Refractive Index Method ("CRIM") to obtain an estimation of the water-filled formation porosity. However, previous applications of this method have implicit assumptions that may lead to inaccurate analysis of formation porosity.

BRIEF DESCRIPTION OF THE DRAWINGS

FIG. 6 is a flow diagram of an illustrative method for calculating formation porosity of a borehole.

DETAILED DESCRIPTION

The issues identified in the background are at least in part addressed by the disclosed dielectric tool-based formation porosity logging systems and methods. In at least one embodiment, the method includes obtaining complex dielectric constant measurements with a high frequency dielectric tool. Next, a dielectric constant of formation water is derived from the complex dielectric constant measurements. Finally, a formation porosity is determined based at least in part on the measured complex dielectric constant and the derived dielectric constant formation water.

Figure 1:
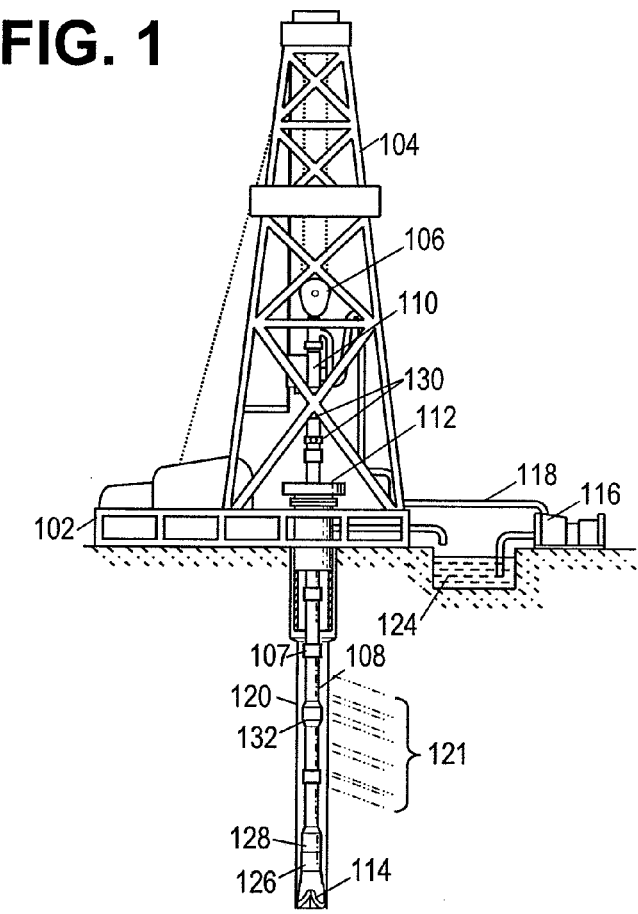
FIG. 1 shows an illustrative logging while drilling environment.

To further assist the reader's understanding of the disclosed systems and methods, we describe environments for their use and operation. Accordingly, an illustrative logging while drilling (LWD) environment is shown in FIG. 1. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of the drill string 108 are connected by threaded connectors 107. Connected to the lower end of the drill string 108 is a drill bit 114. As bit 114 rotates, it creates a borehole 120 that passes through various formations 121. A pump 116 circulates drilling fluid through a supply pipe 118 to top drive 110, downhole through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

Figure 2:
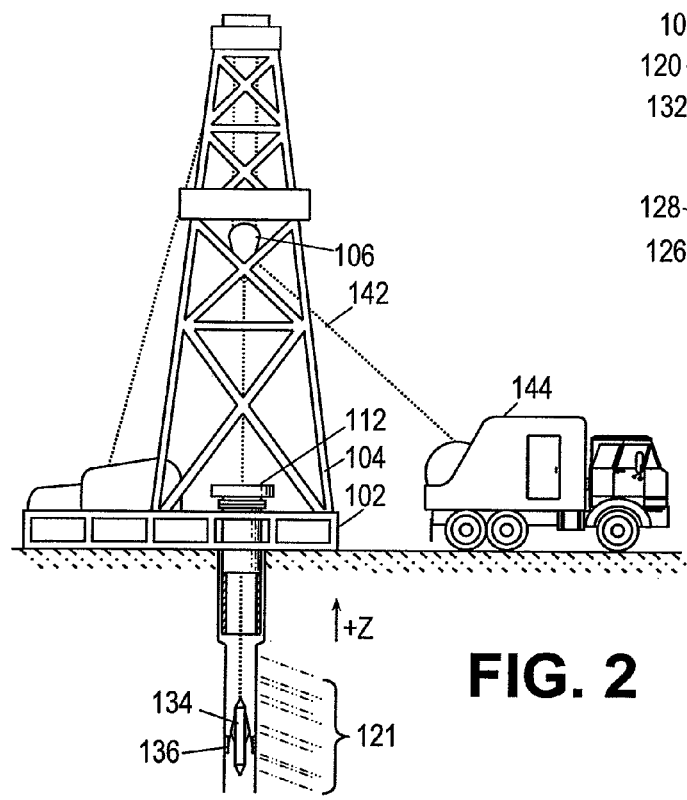
FIG. 2 shows an illustrative wireline drilling environment.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A resistivity imaging portion of the logging tool 134 may have centralizing arms 136 that center the tool within the borehole as the tool is pulled uphole. A logging facility 144 collects measurements from the logging tool 134, and includes computing facilities for processing and storing the measurements gathered by the logging tool. FIGS. 1 and 2 show formations 121 that are not perpendicular to the borehole, a situation that may occur naturally or may occur due to directional drilling operations.

The logging tool used in these environments may include an high frequency dielectric tool (HFDT). The present application discloses a method for estimating the near wellbore apparent formation water resistivity and dielectric constant from the direct HFDT measurements and formation temperature measured by temperature sensors. Once the apparent formation water dielectric and resistivity are known, the formation porosity may be accurately determined by applying the CRIM calculations.

The CRIM equation that may be used in analyzing the subterranean formation characteristics may be presented as:

$$\sqrt{\epsilon_{Meas}} = \sqrt{\epsilon_{Matrix}}(1-\phi) + \sqrt{\epsilon_w}\phi S_{xo} + \sqrt{\epsilon_{HC}}\phi(1-S_{xo}) \quad (1)$$

where $\epsilon_{Meas}$, $\epsilon_{Matrix}$, $\epsilon_w$, $\epsilon_{HC}$ are the complex dielectric constants of the measured formation, rock matrix, mud filtrate, and hydrocarbons, respectively; $\phi$ is the formation total porosity; and $S_{xo}$ denotes the water saturation. The water content ($\square_w$) of the near borehole formations is often assumed to come from mud filtrate.

When the formation is filled with water, the porosity may be expressed as:

$$\phi_{Water} = \frac{\sqrt{\epsilon_{Meas}} - \sqrt{\epsilon_{Matrix}}}{\sqrt{\epsilon_w} - \sqrt{\epsilon_{Matrix}}} \quad (2)$$

where the dielectric contants on the right hand side of Eq. (2) are complex values that depend on resistivity and permittivity.

Even in its simplified form (Eq. (2)), if the formation water is not from the drilling mud, then the CRIM equation has three unknowns: (1) the porosity; (2) the water resistivity; and (3) the water dielectric constant. (The complex dielectric constant for the rock matrix can often be accurately approximated based on laboratory measurements for that rock type. One proposed approach is to express each complex term in Eq. (1) in terms of its real and imaginary parts and obtain two equations by equating the real parts and imaginary parts of each side. However, this method may not be well-conditioned and may produce multiple solutions in some circumstances.

In another proposed approach, an assumption is applied in Eq. (2) that the water residing in the porosity comes from the drilling mud and its resistivity and dielectric constant can be measured directly from measurements at the surface. However, that may not always be the case. For instance, in some cases the water is a mixture of mud filtrate and original formation water near borehole and hence the complex dielectric constant of this water mixture in the near wellbore may not be equal to that of the mud filtrate. In other cases the near wellbore water can be a mixture of mud filtrate, original formation water and water that has been injected from nearby wells in, for example, a water flooded reservoir. In such instances, Eq. (2) may not produce the correct formation porosity.

Figure 3:
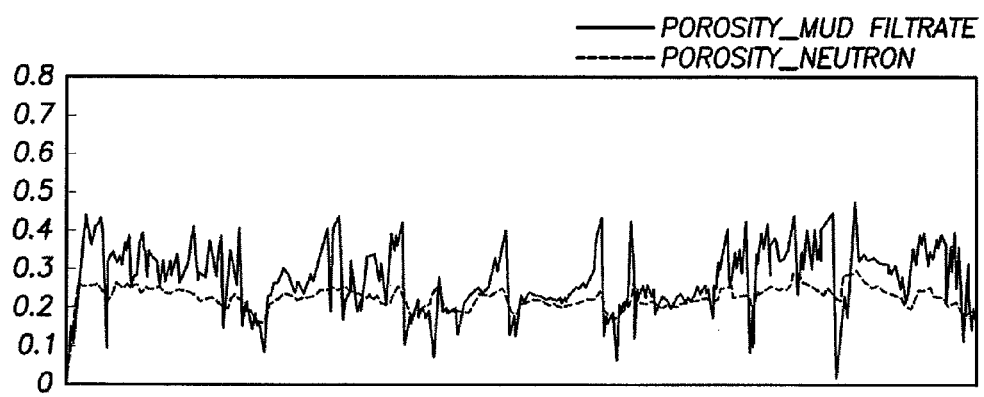
FIG. 3 shows an illustrative comparison between a neutron porosity log and a HFDT porosity log.

FIG. 3 depicts an example of the effect of high salinity formation water mixing with mud filtrate on HFDT porosity. The solid line shows the estimated HFDT porosity in accordance with using mud filtrate dielectric constant and resistivity as obtained from surface measurements. The dotted line shows an independent measurement of porosity that may be obtained by, for example, a neutron tool. As shown in FIG. 3, in this example, the existence of saline formation water causes the HFDT porosity of Eq. (2) to overestimate true porosity.

In accordance with an exemplary embodiment of the present invention, the electromagnetic loss tangent may be used to determine formation water resistivity and dielectric constant directly from the tool-measured formation electromagnetic properties. The formation has a complex relative dielectric constant that can be expressed as:

$$\varepsilon = \varepsilon' + j\left(\frac{1}{\omega \varepsilon_0 R} + \varepsilon''\right) \quad (3)$$

where $\varepsilon'$ represents the lossless relative permittivity; $\varepsilon''$ is the imaginary component of permittivity attributed to bound charge and relaxation phenomena; and R denotes the formation resistivity. The loss tangent of the formation may be defined as the ratio of the imaginary part over the real part of the complex dielectric constant and may be expressed as:

$$\tan\delta = \frac{1}{\omega \varepsilon_0 R \varepsilon'} + \frac{\varepsilon''}{\varepsilon'} \quad (4)$$

The loss tangent of formation water can be similarly expressed as:

$$(\tan\delta)_w = \frac{1}{\omega \varepsilon_0 R_w \varepsilon'_w} + \frac{\varepsilon''_w}{\varepsilon'_w} \quad (5)$$

where the ratio $\varepsilon''_w/\varepsilon'_w$ denotes the water dielectric loss; and $\varepsilon'_w$ is the water dielectric constant. As would be appreciated by those of ordinary skill in the art, with the benefit of this disclosure, dielectric loss well known to those of ordinary skill in the art and will therefore not be discussed in detail herein. A discussion of the water dielectric loss may be found, for example, at http://www.rfcafe.com/references/electrical/dielectric-constants-strengths.htm, or in Seiichi Sudo, DIELECTRIC RELAXATION TIME AND RELAXATION TIME DISTRIBUTION OF ALCOHOL-WATER MIXTURES, J. Phys. Chem. A, vol. 106, No. 3, pp. 458-464, 2002.

The water dielectric constant, $\varepsilon'_w$, is a function of the water resistivity $R_w$ and the water temperature, T, and can be expressed as:

$$\varepsilon'_w = f(R_w, T) \quad (6)$$

As would be appreciated by those of ordinary skill in the art with the benefit of this disclosure, the empirical functions off reflected in Eq. (6) are well known to those of ordinary skill in the art and commonly used in the industry and will therefore not be discussed in detail herein. For instance, a discussion of the empirical functions of $f$ may be found in Stogryn, A., EQUATIONS FOR CALCULATING THE DIELECTRIC CONSTANT OF SALINE WATER, IEEE Trans. on Microwave Theory and Techniques, Vol. 19 No. 8, pp. 733-736, 1971; and Klein, L., and Swift, T., AN IMPROVED MODEL FOR THE DIELECTRIC CONSTANT OF SEA WATER AT MICROWAVE FREQUENCIES, IEEE Trans. on Antennas and Propagation, Vol. AP-25, No. 1, pp. 104-111, 1997.

The relaxation loss of dry formation matrices is much smaller than the relaxation loss of water, enabling us to neglect the formation's relaxation loss and to express the formation loss tangent as $$(\tan\delta)_{Meas} = \frac{I_m\{\varepsilon_{Meas}\}}{R_e\{\varepsilon_{Meas}\}} = \frac{1}{\omega \varepsilon_0 R_{meas} \varepsilon'_{meas}} \quad (7)$$

where $\square_{Meas}$ is the formation's apparent complex dielectric constant measured by HFDT, $R_{Meas}$ is the apparent formation resistivity and $\square_{Meas}$ is the apparent loss less relative permittivity.

As a secondary results of neglecting the formation matrix's relaxation loss, the measured formation loss tangent should be equal to the formation water loss tangent, and may be represented as:

$$\frac{1}{\omega \varepsilon_0 R_{meas} \varepsilon'_{meas}} = \frac{1}{\omega \varepsilon_0 R_w \varepsilon'_w} + \frac{\varepsilon''_\omega}{\varepsilon'_\omega} \quad (8)$$

In practice, the effect of mud cake, the matrix, and tool parameters may cause discrepancies between the measured loss tangent and that of the formation water. One of the methods to compensate the discrepancies lies in introducing an environment factor $\alpha$ to equation (8), such that:

$$\frac{1}{\omega \varepsilon_0 R_{meas} \varepsilon'_{meas}} = \alpha \left(\frac{1}{\omega \varepsilon_0 R_\omega \varepsilon'_\omega} + \frac{\varepsilon''_\omega}{\varepsilon'_\omega}\right) \quad (9)$$

As would be appreciated by those of ordinary skill in the art, with the benefit of this disclosure, the environment factor, $\alpha$, may be obtained by calibration.

By solving the two simultaneous Eqs. (6) and (8) (or if the correction factor is used, Eq. (9)), the formation water resistivity and dielectric constant may be obtained. These values may be deemed the "actual" resistivity and the "actual" dielectric constant of the formation water as they more closely resemble the actual values. Moreover, the corrected formation porosity may be obtained by substituting the derived actual and actual dielectric constant of the water into Eq. (2).

Equations (8) or (9) are proposed to estimate water resistivity and dielectric constant from water-saturated formations. In actual downhole logging, a tool may confront non-water-saturated formations or near-zero porosity formations. In these unfavorable cases, if the stated embodiment above is still applied to estimate formation water resistivity, it could produce a number larger than actual water resistivity because of the lack of saturation water in the formation.

Accordingly, in one exemplary embodiment, the methods disclosed herein may be adapted for application to all formation cases. In this embodiment, Equation (6) may be substituted into Equation (9) to derive an equation of $R_w$:

$$\frac{1}{\omega \varepsilon_0 R_{meas} \varepsilon'_{meas}} = \alpha \left( \frac{1}{\omega \varepsilon_0 R_\omega \varepsilon'_\omega} + \frac{\varepsilon''_\omega}{f(\tilde{R}_\omega, T)} \right) \quad (10)$$

Eq. (10) may be solved for $R_w$ and the determined value may be compared with a given resistivity limit $R_{Limit}$. The smaller of these two values (i.e., $R_w$ and $R_{Limit}$) may be taken as the true water resistivity and be used to find water dielectric constant from Equation (6):

$$\tilde{R}_\omega = \min\{R_w, R_{Limit}\} \quad (11)$$

$$\varepsilon'_\omega = f(\tilde{R}_\omega, T) \quad (12)$$

The given limit $R_{limit}$ may be based on measurements of the drilling fluids resistivity or other values taken according to the formation properties. The corrected formation porosity may then be obtained by substituting the results from Eqs. (11) and (12) into Eq. (2).

Figure 4:
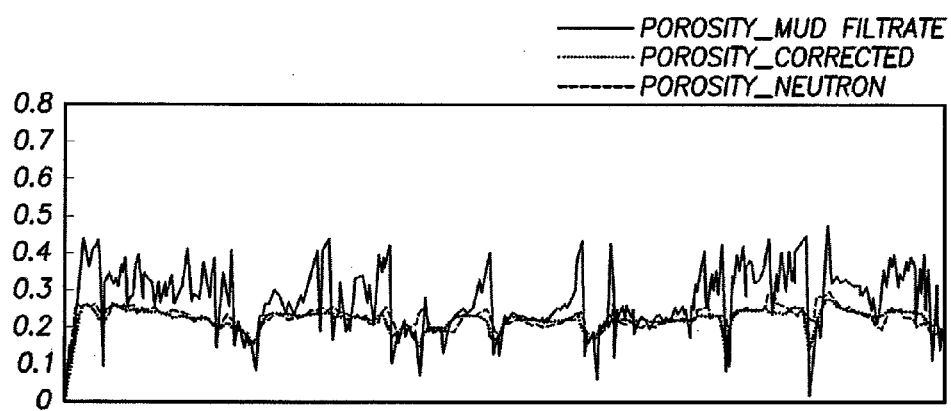
FIG. 4 shows an illustrative comparison between a corrected HFDT porosity log and the porosity loss of FIG. 3.

FIG. 4 shows a corrected HFDT porosity obtained in accordance with an exemplary embodiment of the present invention. As shown in FIG. 4, the corrected HFDT porosity closely follows the independent measurement of porosity that may be obtained by, for example, a neutron tool.

Figure 5:
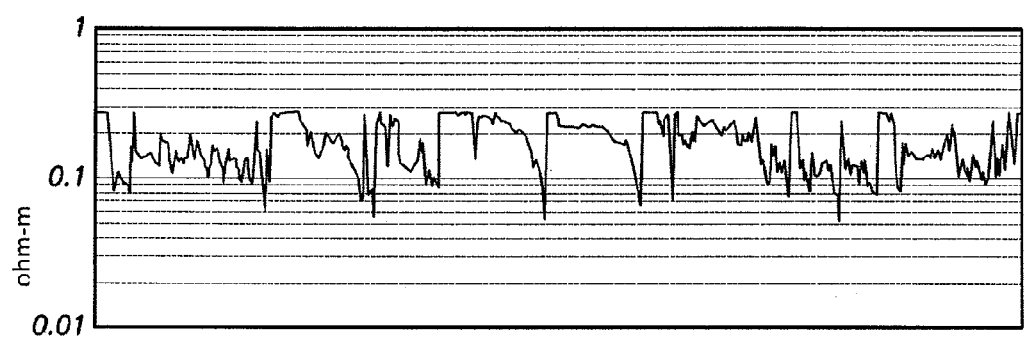
FIG. 5 is an illustrative log of formation water resistivity.

FIG. 5 depicts the formation water resistivity derived in accordance with Eq. (10) and (11). As shown in FIG. 5, the derived formation water resistivity is not constantly equal to the mud filtrate.

FIG. 6 shows an illustrative flow diagram for calculating formation porosity of a borehole. In block 602, complex dielectric constant measurements are obtained using a high frequency dielectric tool. In block 604, a dielectric constant of formation water is derived from the measured complex dielectric constant measurements. The complex dielectric constant is expressed in Eq. (3). The derivation of the dielectric constant of formation water includes calculating a loss tangent of formation water. The loss tangent of formation water is expressed in Eq. (5). Finally, in block 606, a formation porosity is determined, based at least in part on the measured complex dielectric constant and the derived dielectric constant formation water. The calculation of formation porosity includes utilizing the CRIM estimation. Determining a formation porosity includes simultaneously solving Eqs. (9) and (12).

At least some system embodiments can include a processor and storage medium for information handling. The processor will be communicatively coupled to a logging tool, such as a HFDT tool, through a wired or wireless communication system. The processor will be used to make calculations need for determining formation porosity. The processor may process the data received from the logging tool in accordance with the foregoing disclose embodiments as software in a memory. Moreover, all or a portion of the data received from the HFDT tool or calculated by the processor may be stored in a computer-readable media. These and other variations and modifications will become apparent to those skilled in the art once the above disclosure is fully appreciated. It is intended that the following claims be interpreted to embrace all such variations and modifications.

What is claimed is:

1. A formation porosity logging method, comprising:
obtaining complex dielectric constant measurements with a dielectric tool;
deriving a complex dielectric constant of formation water from the measured complex dielectric constant measurements;
wherein deriving the complex dielectric constant of formation water comprises determining a loss tangent of formation water as a function of water dielectric loss, water dielectric constant and water resistivity, wherein the loss tangent of formation water is a ratio of an imaginary part of the complex dielectric constant over a real part of the complex dielectric constant; and
determining a formation porosity, based at least in part on the measured complex dielectric constant and the derived complex dielectric constant of formation water.

2. The method of claim 1, wherein said complex dielectric constant is expressed as $$\varepsilon = \varepsilon' + j\left(\frac{1}{\omega \varepsilon_0 R} + \varepsilon''\right)$$

wherein $\varepsilon'$ represents the lossless relative permittivity, $\varepsilon''$ represents imaginary component of permittivity attributed to bound charge and relaxation phenomena, and R represents formation resistivity.

3. The method of claim 1, wherein said loss tangent of formation water is expressed as $$(\tan \delta)_w = \frac{1}{\omega \varepsilon_0 R_w \varepsilon'_w} + \frac{\varepsilon''_w}{\varepsilon'_w}$$

wherein $\varepsilon''_w / \varepsilon'_w$ represents water dielectric loss, $\varepsilon'_w$ represent water dielectric constant and $R_w$ represents water resistivity.

4. The method of claim 3, wherein water dielectric constant ($\varepsilon'$) is a function of water resistivity and temperature.

5. The method of claim 1, wherein determining a formation porosity includes simultaneously solving equations $\varepsilon'_w = f(R_w, T)$ and $$\frac{1}{\omega \varepsilon_0 R_{meas} \varepsilon'_{meas}} = \alpha \left( \frac{1}{\omega \varepsilon_0 R_\omega \varepsilon'_\omega} + \frac{\varepsilon''_\omega}{\varepsilon'_\omega} \right)$$

to determine formation water resistivity and dielectric constant, wherein $\varepsilon'_w$ represents water dielectric constant, $R_w$ represents water resistivity, T represents water temperature, $R_{meas}$ represents apparent formation resistivity, $\varepsilon'_{meas}$ represents formation's apparent complex dielectric constant, α is an environmental factor, and $\in''_w/\in'_w$ represents water dielectric loss.

6. The method of claim 5, wherein α is an environmental factor obtained by calibration to account for discrepancies.

7. The method of claim 6, wherein said discrepancies include the effect of mud cake, the matrix, and system parameter drifts.

8. The method of claim 1, wherein said determining a formation porosity, further includes substituting said water resistivity and said dielectric constant into this equation $$\phi_{Water} = \frac{\sqrt{\varepsilon_{Meas}} - \sqrt{\varepsilon_{Matrix}}}{\sqrt{\varepsilon_{MF}} - \sqrt{\varepsilon_{Matrix}}},$$

wherein $\in_{meas}$ represents complex dielectric constant of measured formation, $\in_{matrix}$ represents complex dielectric constant of rock matrix, and $\in_w$ represents complex dielectric constant of mud filtrate.

9. The method of claim 1, wherein said determining the formation porosity further comprises utilizing a Complex Refractive Index Method estimation.

10. A system for determining borehole formation characteristics comprising:
   a dielectric tool that obtains complex dielectric constant measurements; and
   a processor that operates on the complex dielectric constant measurements to derive a complex dielectric constant of formation water and to determine a formation porosity, based at least in part on the measurements and the derived complex dielectric constant of formation water;
      wherein said derived complex dielectric constant of formation water is derived by determining a loss tangent of formation water as a function of water dielectric loss, water dielectric constant and water resistivity, wherein the loss tangent of formation water is ratio of an imaginary part of the complex dielectric constant over a real part of the complex dielectric constant.

11. The system of claim 10, wherein said complex dielectric constant is expressed as $$\varepsilon = \varepsilon' + j\left(\frac{1}{\omega\varepsilon_0 R} + \varepsilon''\right)$$

wherein $\in'$ represents the lossless relative permittivity, $\in''$ represents imaginary component of permittivity attributed to bound charge and relaxation phenomena, and R represents formation resistivity.

12. The system of claim 10, wherein said loss tangent of formation water is expressed as $$(\tan\delta)_w = \frac{1}{\omega\varepsilon_0 R_w \varepsilon'_w} + \frac{\varepsilon''_w}{\varepsilon'_w}$$

wherein $\in''_w/\in'_w$ represents water dielectric loss, $\in'_w$ is the water dielectric constant and $R_w$ represents water resistivity.

13. The system of claim 12, wherein water dielectric constant ($\in'$) is a function of water resistivity and temperature.

14. The system of claim 10, wherein said formation porosity is derived by simultaneously solving equations $$\frac{1}{\omega\varepsilon_0 R_{meas}\varepsilon'_{meas}} = \alpha\left(\frac{1}{\omega\varepsilon_0 R_\omega \varepsilon'_\omega} + \frac{\varepsilon''_\omega}{\varepsilon'_\omega}\right)$$

to determine formation water resistivity and dielectric constant, wherein $\in'_w$ represents water dielectric constant, $R_w$ represents water resistivity, T represents water temperature, $R_{meas}$ represents apparent formation resistivity, $\in_{meas}$ represents formation's apparent complex dielectric constant, α is an environmental factor, and $\in''_w/\in'_w$ represents water dielectric loss.

15. The system of claim 14, wherein α is an environmental factor obtained by calibration to account for discrepancies.

16. The system of claim 15, wherein said discrepancies include the effect of mud cake, the matrix, and system parameter drifts.

17. The system of claim 10, wherein said formation porosity, further includes substituting said water resistivity and said dielectric constant into this equation $$\phi_{Water} = \frac{\sqrt{\varepsilon_{Meas}} - \sqrt{\varepsilon_{Matrix}}}{\sqrt{\varepsilon_{MF}} - \sqrt{\varepsilon_{Matrix}}},$$

wherein $\in_{meas}$ represents complex dielectric constant of measured formation, $\in_{matrix}$ represents complex dielectric constant of rock matrix, and $\in_w$ represents complex dielectric constant of mud filtrate.

18. The system of claim 10, wherein said formation porosity is derived by utilizing a Complex Refractive Index Method estimation.

\* \* \* \* \*